UNITED STATES PATENT OFFICE.

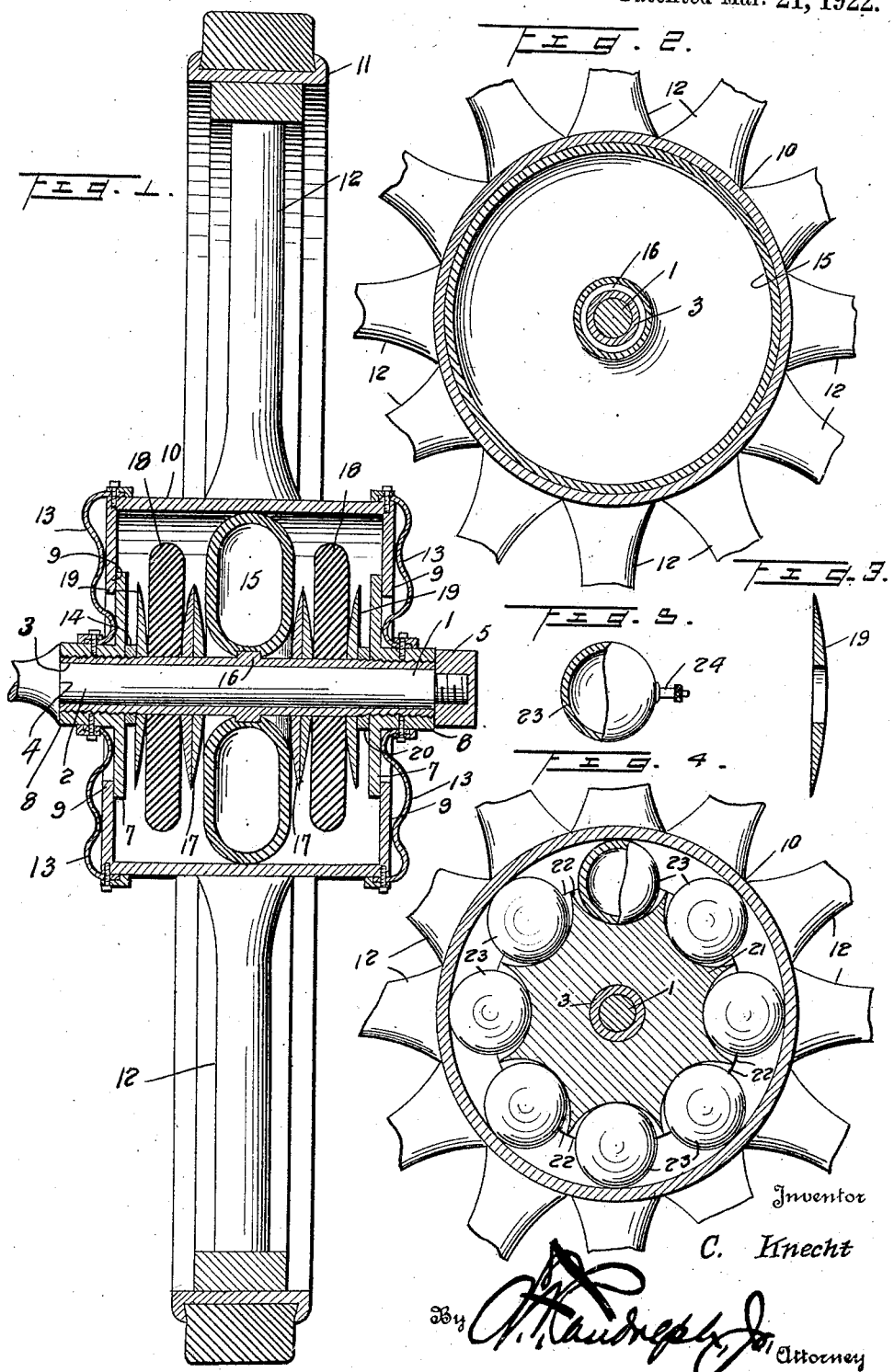

CHARLES KNECHT, OF ST. LOUIS, MISSOURI.

AUTOMOBILE WHEEL HUB.

1,410,323.   Specification of Letters Patent.   Patented Mar. 21, 1922.

Application filed December 30, 1920. Serial No. 434,043.

*To all whom it may concern:*

Be it known that I, CHARLES KNECHT, a citizen of the United States, residing at St. Louis, in the State of Missouri, have invented certain new and useful Improvements in Automobile Wheel Hubs; and I do hereby declare the following to be a full, clear, and exact description of the invention, such as will enable others skilled in the art to which it appertains to make and use the same.

This invention relates to new and useful improvements in automobile wheel hubs and has for its primary object the provision of a cushion hub adapted to absorb shocks and jars to which the wheel is subject and thereby obviate the employment of a pneumatic tire, for such a purpose, and consequently eliminate the disadvantages and expense attached to the use of such cushion means.

Another object of this invention is the provision of a main cushioning element located in the hub and adapted to receive the initial shocks and jars to the wheel and which has associated therewith auxiliary cushioning elements for absorbing shocks and jars that are not consumed by the main cushioning element, thereby insuring a complete absorption of the shocks and jars and consequently providing a smooth riding wheel.

A further object of this invention is the provision of means for mounting the cushioning elements which will allow adjustment of the latter on the axle and in relation to the hub.

A still further object of this invention is the provision of an automobile wheel hub of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts that will be hereinafter more fully described and claimed.

For a complete understanding of my invention, reference is to be had to the following description and accompanying drawings, in which:

Figure 1 is a longitudinal sectional view, illustrating an automobile wheel hub constructed in accordance with my invention, Figure 2 is a transverse sectional view illustrating the same, Figure 3 is a detail view illustrating the spacing plates, Figure 4 is a transverse sectional view illustrating a modified form of my invention, Figure 5 is a detail view illustrating a pneumatic cushioning ball which may be employed with my modified form of invention.

Referring in detail to the drawings, the numeral 1 indicates an axle having a spindle 2 for rotatably supporting a bushing or sleeve 3 and the latter is retained on the spindle against endwise movement by means of an integral shoulder 4 of the axle 1 and a nut 5 threaded to the end of said spindle 2. Retaining plates 7 of circular formation are provided with hub portions 8 threaded or otherwise secured to the bushing or sleeve 3 adjacent its ends and have slidable contact with inwardly directed flanges 9 formed upon a hub 10. The hub 10 is connected to the rim 11 by spokes 12 and said rim may have mounted thereon a tire of any desired construction. Fabric 13 is secured to the hub 10 and to the hub portions 8 of the retaining plates 7 for the purpose of preventing dirt and other foreign matter from entering the interior of said hub. The inner retaining plate 7 is prevented from having endwise movement on the sleeve or bushing 3 in one direction by a jam nut 14 threaded to said sleeve or bushing 3 while the outer retaining plate 7 is prevented from having endwise movement on the bushing or sleeve 3 by the nut 5 which is threaded to the end of the spindle 2. The retaining plates 7 also are threaded to the bushing or sleeve 3.

A main cushioning member 15 is mounted upon the sleeve or bushing 3 at a point intermediate the ends of the latter and engages the inner face of the hub 10. The main cushioning element 15 is of annular formation and also is hollow, the air being hermetically sealed therein. The main cushioning element 15 is constructed of rubber or any other material suitable for the purpose and is provided with an annular groove to receive an annular rib 16 formed on the bushing or sleeve 3 to prevent said cushioning element from having endwise movement on said sleeve or bushing 3.

Plano-convex spacing plates 17 are mounted on the bushing or sleeve 3 and at each side of the cushioning element 15 and are arranged in pairs with their straight faces disposed in opposed relation. Auxiliary cushioning elements 18 constructed of solid rubber or other suitable material are mounted on the bushing or sleeve 3 and are spaced slightly from the inner face of the hub 10 so that the main cushioning element 15 is the first to receive the shock or jar and after compression of the main cushioning element, the auxiliary cushioning element then consumes the shocks and jars. Single planoconvex spacing plates 19 are mounted upon the bushing or sleeve 3 and engage the outer faces of the auxiliary cushioning elements 18 and are prevented from having endwise movement on the bushing or sleeve by jam nuts 14 and 20 threaded to said bushing or sleeve and providing a construction which will permit adjustment of the auxiliary cushioning elements 18 and the wear plates 17 upon the bushing or sleeve 3.

The retaining plates 7 are also capable of adjustment on the sleeve or bushing 3 which permits the hub 10 to be adjusted in relation to the main and auxiliary cushioning elements.

Referring to my modified form of invention, a plate 21 is mounted on the bushing or sleeve 3 in lieu of the main cushioning element 15 and is provided in its periphery with a series of pockets 22 adapted to receive cushioning balls 23 that are of hollow formation, and are hermetically sealed so as to contain air therein. The cushioning balls 23 bear against the inner face of the hub 10. The balls 23 may be constructed of any material suitable for the purpose and as shown in Figure 5 may be of the inflatable type provided with suitable valves 24.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A wheel hub comprising an axle receiving sleeve, a hub receiving the sleeve, a main cushion member secured to the sleeve and supporting the hub, auxiliary cushion elements carried by the sleeve and normally spaced from the hub and adapted to come in contact and support the latter after a predetermined contraction of the cushion member.

2. A wheel hub comprising an axle receiving sleeve, a hub receiving the sleeve, a hollow annular cushion member secured to the sleeve and supporting the hub, annular auxiliary cushioning elements carried by the sleeve and normally spaced from the hub and adapted to come in contact and support the latter after a predetermined contraction of the cushion member, said elements being constructed of solid material.

3. A wheel hub comprising an axle receiving sleeve, a hub receiving said sleeve, a main cushion member between the sleeve and the hub and normally supporting the latter, auxiliary cushion elements mounted on the sleeve and spaced from the hub and main cushion member, and spacing disks on the sleeve and having convex faces to engage the cushion member and elements, said faces adapted to prevent chafing of the cushion elements and member by the peripheries of said disks during the contraction and expansion of said cushion elements and member.

In testimony whereof I affix my signature in presence of two witnesses.

CHARLES KNECHT.

Witnesses:
CARL LAMBUR,
CLARA MOLITOR.